June 1, 1965 R. E. HUNT 3,186,446

APPARATUS FOR ATTACHING FILAMENTARY MATERIAL

Filed May 9, 1961 4 Sheets-Sheet 1

INVENTOR.
ROBERT E. HUNT

BY David M. Keay

AGENT.

INVENTOR.
ROBERT E. HUNT
BY
David M. Keay
AGENT.

June 1, 1965 R. E. HUNT 3,186,446

APPARATUS FOR ATTACHING FILAMENTARY MATERIAL

Filed May 9, 1961 4 Sheets-Sheet 3

INVENTOR.
ROBERT E. HUNT
BY David M. Keay
AGENT.

June 1, 1965 R. E. HUNT 3,186,446

APPARATUS FOR ATTACHING FILAMENTARY MATERIAL

Filed May 9, 1961 4 Sheets-Sheet 4

INVENTOR.
ROBERT E. HUNT
BY David M. Keay
AGENT.

United States Patent Office 3,186,446
Patented June 1, 1965

3,186,446

APPARATUS FOR ATTACHING FILAMENTARY MATERIAL

Robert E. Hunt, Reading, Mass., assignor to Sylvania Electric Products Inc., a corporation of Delaware Filed May 9, 1961, Ser. No. 108,859
2 Claims. (Cl. 140—93)

This invention relates to attaching lengths of filamentary material to objects. More particularly, it is concerned with apparatus for thermal compression bonding the end of a length of wire from a supply to an object and then severing the length of wire from the supply.

In the manufacture of semiconductor devices of various types it is commonly the practice to mount the electrically active elements of a device on a header or base section of an enclosure for the device. Leads for making electrical contact between the electrodes of the active elements and the electrical circuitry in which the device is to be employed pass through the base section and are sealed to it while being electrically insulated from each other. In order to complete the conduction paths to the electrodes, electrical connections must be made between the electrodes of the active elements and the appropriate leads. Short lengths of fine wire which are soldered to the electrodes and the leads are commonly employed for this purpose.

In certain types of devices the size and position of the electrodes render it extremely difficult to make satisfactory electrical and mechanical contacts to the electrodes. For example, in the so-called "mesa" type of transistor the emitter and base electrodes are extremely small areas or stripes of metal which are evaporated onto the surface of a body of semiconductor material and then alloyed into the body. The problem of making contact to these stripes has been met by the development of the now well-known thermal compression bonding technique. In practicing this technique extremely fine wire is bonded to a stripe by placing a portion of a length of the wire on the stripe and pressing the wire into intimate contact with the stripe by means of a wedge-shaped bonding tool. Heat is applied to the device during the period of compression. A satisfactory electrical and mechanical bond is thus established between the stripe and the length of contact wire. The other end of the contact wire is then attached to an appropriate lead either by thermal compression bonding or by any of other more conventional techniques.

Although the thermal compression bonding technique as outlined above provides a satisfactory electrical and mechanical contact between the contact wire and the stripe, there are many problems involved in rapidly and properly making these connections on a production basis. Some of the difficulty is caused by the necessity for aligning the bonding tool with the stripe which may have dimensions of the order of 1 mil by 2 mils. Even more difficult, however, is the problem of manipulating the fine contact wire which typically is of gold and only about 0.4 mil in diameter. This wire is extremely difficult to handle, position properly intermediate the bonding tool and stripe, and maintain in position during bonding.

It is an object of the present invention, therefore, to provide an improved apparatus for attaching a length of filamentary material to an object.

It is a more specific object of the invention to provide improved apparatus for thermal compression bonding to an object the end of a length of wire from a supply of wire, and then severing the length of wire from the supply.

Briefly, in accordance with the foregoing objects, apparatus according to the invention includes a bonding tool reciprocally moveable to press successive freshly severed end portions of the filamentary material against an object at one extremity of its movement. Filamentary material supply means associated with the bonding tool intermittently and successively present the end portions of the filamentary material to objects. Shearing means which are reciprocally moveable into and out of the path of movement of the bonding tool are provided for cutting the filamentary material. A portion of the shearing means is arranged to cooperate with the bonding tool so as to bend each of the end portions of the filamentary material so that the end portions successively extend across the path of movement of the bonding tool.

It is a feature of the invention to employ a bonding tool having a passage therethrough which lies parallel to the direction of advancement and withdrawal of the tool and terminates in an aperture in the vicinity of the bonding surface. Filamentary material from a supply extends through the passage and is thus maintained adjacent the bonding surface at the aperture.

It is also a feature of the invention to employ as a severing means a set of blades which cut the filamentary material by shearing it close to the bonding surface. One of the shear blades pushes the freshly severed end portion of filamentary material from the supply and bends it over adjacent the bonding surface and intermediate the bonding surface and the bonding location.

Additional objects, features, and advantages of apparatus according to the invention will be apparent from the following detailed discussion and the accompanying drawings wherein.

In considering the accompanying drawings it should be understood that by reason of the extremely small actual size of portions of the semiconductor devices with which the apparatus illustrated is particularly concerned, it has been necessary in some of the figures to show certain elements of the devices and certain portions of the apparatus disproportionate in size to related elements and portions.

Figure 1:
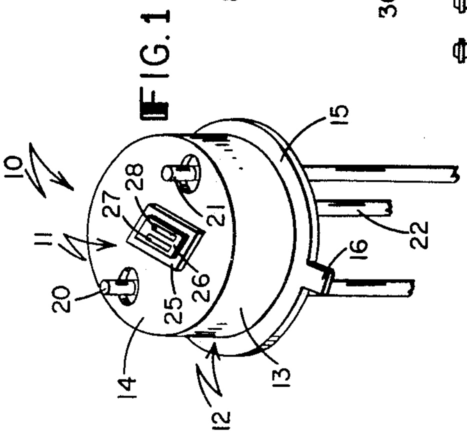
FIG. 1 is a perspective view of the electrically active elements of a mesa type transistor requiring contact wires to be connected between two electrodes or stripes and the appropriate leads of the header on which the elements are mounted.

FIG. 1 illustrates a mesa type transistor 10 having its active elements 11 mounted on the base section or header 12 of a commonly employed type of two-part semiconductor device enclosure. The base section includes a cylindrical metal casing 13 having a flat upper surface 14 and an outwardly turned lower rim 15 for sealing to a cover portion (not shown) to complete the enclosure. An orienting tab 16 extends outwardly from the rim. A layer of glass is hermetically sealed in the casing. Two leads 20 and 21 pass through the layer of glass to which they are hermetically sealed and extend through openings in the upper surface of the metal casing. A third lead 22 passes through the layer of glass and makes contact with the casing. The location of the leads is established with respect to the orienting tab 16.

The active elements 11 of the mesa type transistor include a wafer 25 of semiconductor material having a raised portion or mesa 26 on which are located two electrodes or stripes 27 and 28. The wafer is mounted on the surface of the casing and is in ohmic electrical contact with the casing. Illustratively, the wafer may be of germanium with the first stripe 27 providing the contact to the base region of the device and the second stripe 28 providing the contact to the emitter region of the device. Contact to the collector region of the device is provided through the wafer of germanium, and the third lead 22 is the collector lead of the transistor. Contact wires must be provided between the base stripe 27 and the first lead 20, and between the emitter stripe 28 and the second lead 21 to furnish conductive paths from the regions of the active elements to the leads which will extend externally of the enclosure when the transistor is sealed.

Figure 2:
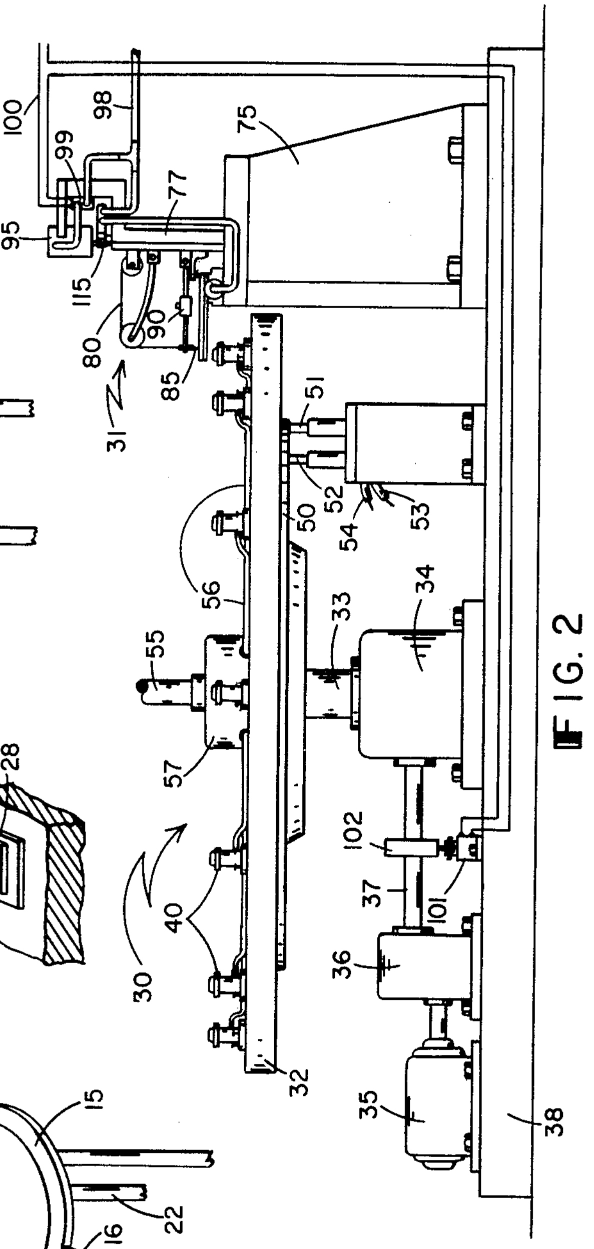
FIG. 2 is a view in elevation illustrating the portions of automatic equipment for applying contact wires to the transistor of FIG. 1 with which the present invention is particularly concerned, including a rotary indexing turret for carrying the transistor and bonding apparatus for applying a length of contact wire to a stripe of the transistor.

A portion of automatic equipment for attaching contact wires between the stripes and the leads is illustrated in FIG. 2. Shown is a rotary indexing turret 30 for carrying transistors through a series of stations at which are performed the operations of applying the contact wires, and bonding apparatus 31 for attaching a length of contact wire to one of the stripes. The turret includes a circular table 32 fastened to a shaft 33. The shaft is periodically turned during a transfer period through one-twelfth of a revolution by an indexing drive mechanism 34. A complete operating cycle of the indexing drive mechanism includes a transfer period and also a dwell period during which the table remains stationary. The indexing drive mechanism is driven by an electric motor 35 through reduction gears 36 and a shaft 37 which makes one revolution for each operating cycle of the turret. The apparatus is supported on a base 38.

Figure 3:
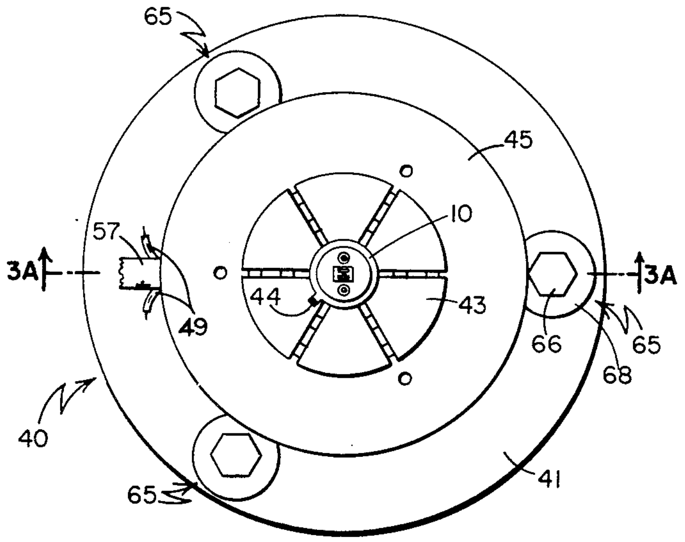
FIG. 3 is a plan view illustrating a holder for supporting a transistor on the rotary turret.
Figure 3A:
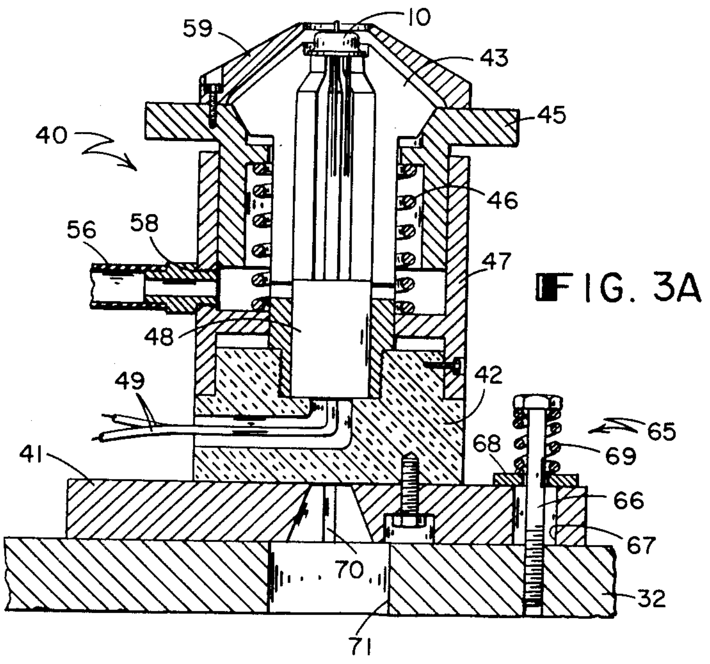
FIG. 3A is an elevational view of the holder of FIG. 3 taken along line 3A—3A of FIG. 3 with portions shown in FIG. 3 removed.

Equally spaced about the periphery of the upper surface of the table are twelve transistor holders 40 one of which is illustrated in greater detail in the plan view of FIG. 3 and in the cross section view of FIG. 3A. A holder includes a base plate 41 which is mounted on the rotary table in a manner to be explained hereinafter. A heat insulating member 42 is bolted to the base plate, and a collet 43 having a number of segments for gripping a transistor is fastened to the insulating member. One of the segments has a groove 44 for receiving the tab of a transistor. The collet segments are forced inward upon the rim of the base section of a transistor by a collar 45 which is forced upward by the action of a compression spring 46 acting against a sleeve 47 fastened to the insulating member. The transistor is released from the grip of the collet by movement of the collar downward against the action of the spring.

A cartridge type electric heater 48 is mounted below the transistor, and the heater leads 49 pass through the table 32 to a pair of slip rings mounted on the underside of the table. One of the rings 50 is visible in FIG. 2. The rings are contacted by brushes 51 and 52, and electrical current is supplied to the brushes from a suitable source (not shown) through two leads 53 and 54. As can also be seen in FIG. 2, a gas line 55 is connected to individual lines 56 for each holder through a rotary seal arrangement 57. The gas, which serves to provide a protective atmosphere for the electrically active elements of the transistor during heating, passes into the holder through a port 58 in the sleeve 47. The gas fills the cavity containing the compression spring and passes through the slots between the collet segments to surround the transistor. A hood 59, which has been removed in FIG. 3, confines the gas to insure that the surfaces of the semiconductor wafer of the transistor 10 are protected by the gas. A protective non-oxidizing gas such as a mixture of hydrogen and nitrogen known as forming gas is generally employed.

The base plate 41 of the holder 40 is mounted to the turret table 32 by means of three sets of fastenings 65 which permit shifting of the holder with respect to the table. Each set of fastenings includes a bolt 66 securely attached to the table and passing through an oversized opening 67 in the holder base plate. A washer 68 is forced into contact against the base plate by a compression spring 69 bearing against the head of the bolt, thus clamping the base plate in position on the table. The base plate has an opening 70 at its center which is accessible through a larger opening 71 in the turret table. This arrangement as described permits the holder to be shifted or rotated slightly by manipulation of a tool inserted into the opening 70 in the base plate, which opening is contoured to mate with the tool. Thus, the position of each holder may be adjusted in order to compensate for variations in transistors so that the elements of each transistor may be positioned precisely as desired.

Figure 4:
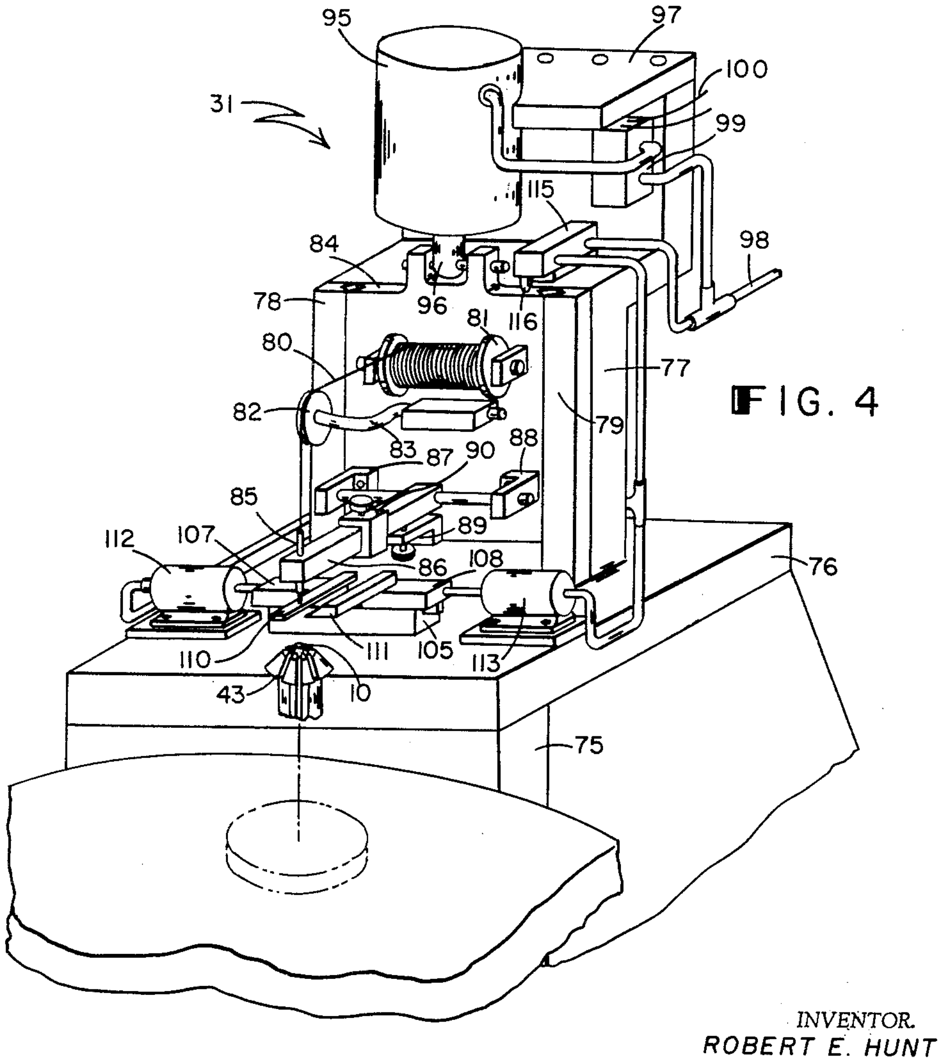
FIG. 4 is a perspective view of bonding apparatus according to the invention for attaching a length of wire to a stripe of a transistor.

The bonding apparatus 31 for attaching a length of wire to one of the stripes of the transistor is illustrated in FIG. 2 and in greater detail in FIG. 4. The apparatus is mounted on the base 38 by means of a support 75 including a base member 76. A vertical bracket 77 is fastened to the base member. A plate or slide 84 is mounted to the bracket by ball-bearing guides 78 and 79 which permit vertical movement of the slide. The slide carries a supply of fine gold wire 80 on a reel 81. Wire from the reel passes over a sheave 82 rotatably mounted on an arm 83 which is pivotally mounted on the slide and spring biased in order to help relieve any sudden strain on the wire. The wire passes from the sheave to a bonding tool 85, the details of which will be described hereinafter. The bonding tool is attached to the end of an arm 86 which is pivotally mounted to the slide on brackets 87 and 88. An adjustable stop 89 attached to the slide limits the extent of downward movement of the bonding tool with respect to the slide. An adjustable weight 90 is positioned along the arm 86 so as to provide the desired force at the bonding tool when it is not bearing against the stop. The bonding tool is located directly above a transistor 10 when the transistor is properly positioned at the bonding location supported in the collet 43 of a holder.

The entire vertical slide 84 and the mechanisms mounted on it are moved upward and downward by the action of an air operated cylinder 95 having its piston 96 fastened through a clevis arrangement to the top of the slide. The slide cylinder is fastened to the vertical bracket 77 by a plate 97. Air under pressure from a line 98 is admitted to the cylinder in order to lower the piston and the slide when a solenoid valve 99 is opened by current flow through its leads 100. The circuit for conducting electrical current from a suitable supply (not shown) through the leads to the solenoid is completed by closing a switch 101 under the action of a cam 102 fastened to the shaft 37 driving the turret indexing drive mechanism as illustrated in FIG. 2. Opening of the circuit permits the solenoid valve to close, and the spring loaded piston of the slide cylinder retracts, withdrawing the slide to its original retracted position.

Attached to the base member 76 of the bonding apparatus is a cutting arrangement for severing the wire. A guide 105 supporting two slides 107 and 108 which may be moved toward and away from each other is fastened to the base member. A first or lower cutting blade 110 is attached to one of the slides 107 and a second or upper cutting blade 111 is attached to the second slide 108. The slides are advanced toward each other by means of air operated cylinders 112 and 113 in order to shear wire placed between the blades. Air under pressure is admitted to the cylinders from the line 98 by a valve 115. When the actuation button 116 of the valve is depressed, the valve opens for an instant and then closes automatically. As the slide 84 is withdrawn to its retracted position, the upper edge of the slide strikes the actuating button of the valve and depresses it. A surge of air passes into the air cylinders thus causing the shears to close. As the surge of air terminates, the spring loaded pistons of the air cylinders 112 and 113 retract the cutting blades. The cutting arrangement is located so as to position the shear blades slightly below the lowermost end of the bonding tool when the vertical slide is in its raised position.

Figures 5, 6, 7:
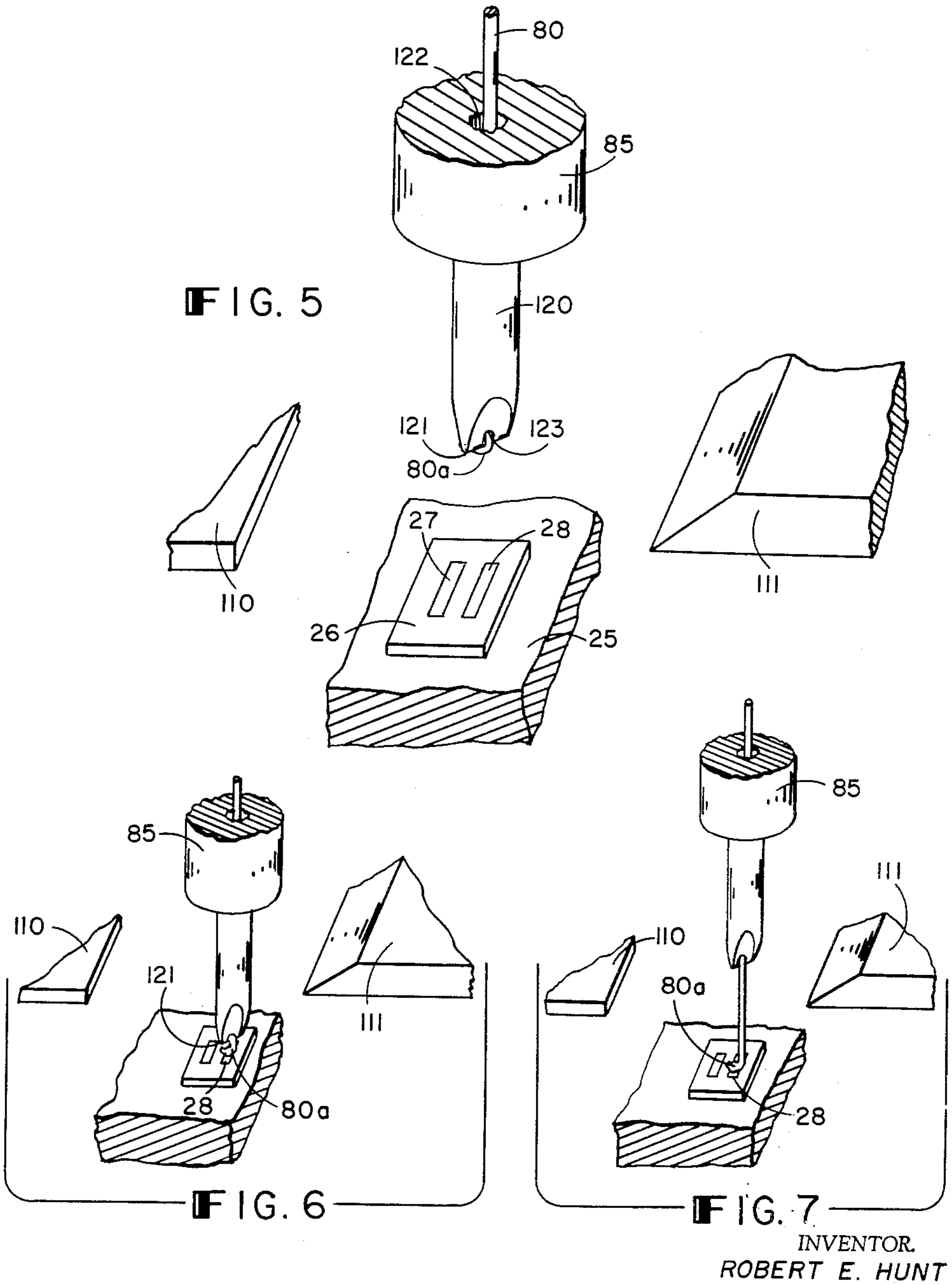

Operation of the apparatus described hereinabove in attaching a length of wire to a stripe of a transistor together with details of the bonding tool can best be understood by reference to FIGS. 5 through 8. As can be seen in FIG. 5 the bonding tool 85 has a tip 120 which terminates in a wedge-shaped bonding surface 121. A passage 122 extends axially through the bonding tool and forms an aperture 123 at the end of the tool and adjacent the bonding surface. The wire 80, which comes from the supply on the reel 81, passes through the passage and out the aperture. The end portion **80*a* of the wire is bent over across the bonding surface as can be seen in FIG. 5. This position of the end portion of the wire from the supply is obtained automatically during the previous operating cycle of the apparatus as will be apparent from the discussion hereinafter. The bonding tool is located directly above one of the stripes 28 of the transistor gripped in the collet of the holder at the bonding location. Proper positioning of the holder on the turret table to insure that the stripe will be directly beneath the bonding tool may be accomplished during a previous operating cycle of the turret before the transistor reaches the bonding location. The means by which the holder may be shifted with respect to the table in order to position the stripe precisely has been discussed briefly hereinabove. Throughout the operation of the equipment electrical current is continually supplied to the heater leads 49 and gas is continually supplied through the line 56** in order to raise the surface of the wafer to the proper temperature for bonding and in order to protect it from oxidation.

After the rotary turret 30 has indexed to place a holder 40 supporting a transistor 10 at the bonding location with a stripe 28 directly beneath the bonding tool 85 as shown in FIG. 5, the cam 102 closes the switch 101 energizing the solenoid valve 99 and causing the slide 84 to advance downward under the action of the air cylinder 95 to its lowermost position. This action lowers the bonding tool together with the wire into bonding position. The distance through which the slide is advanced is slightly greater than the original distance between the bonding surface and the stripe, and thus the arm 86 holding the bonding tool no longer bears against the stop 89. The end portion **80*a* of the wire is thereby compressed between the bonding surface 121 of the tool and the stripe 28**.

The bonding tool is maintained in bonding position for sufficient time so that the pressure of the tool as regulated by the weight 90 creates a thermal compression bond between the compressed portion of the wire and the heated stripe. FIG. 6 illustrates the bonding tool slightly raised from the bonding position showing the wire bonded to the stripe. The configuration of the continuously rotating cam 102 causes the switch 101 to open at the proper time thus closing the solenoid valve 99 and permitting the spring loaded piston 96 of the air cylinder 95 to withdraw the slide 84 from the advanced to the retracted position, thus carrying the bonding tool to its retracted position. As the tool is withdrawn, wire is dispensed from the reel and passes out through the passage in the tool since the end portion of the wire is attached to the stripe and remains stationary. Thus, a length of the wire from the supply lies below the tool with an end portion bonded to the stripe as illustrated in FIG. 7.

Figure 8:
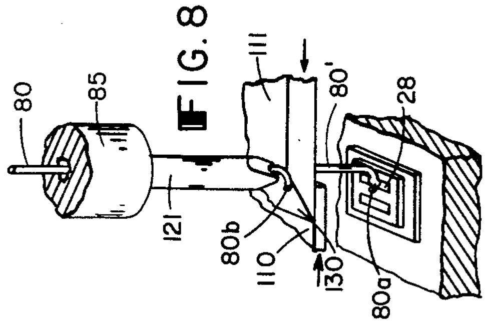
FIGS. 5 through 8 illustrate portions of the apparatus of FIG. 4 during various stages of the operation of the apparatus in attaching a length of wire to a stripe of the transistor of FIG. 1.

As the vertical slide 84 reaches its retracted position, the cutting valve 115 is triggered permitting a surge of air to pass to the air cylinders 112 and 113 and move the shear blades 110 and 111. The first or lowermost blade 110 is arranged, by adjustment of the first air cylinder 112, so that it stops adjacent the wire as shown in FIG. 8. The second or uppermost blade 111 moves across the first blade to sever the wire close to the bonding surface by shearing action between the two blades. As the upper blade continues to move, the inclined edge 130 of the blade bends the new end portion of the wire **80*b*** which passes through the aperture against the bonding tool, thus forcing it against the bonding surface and across the path of advancement of the bonding tool. Upon termination of the air surge to the cutting cylinders, the shear blades are retracted by the spring loaded pistons of the air cylinders to positions which provide adequate clearance for advancing and withdrawing the bonding tool.

Figure 9:
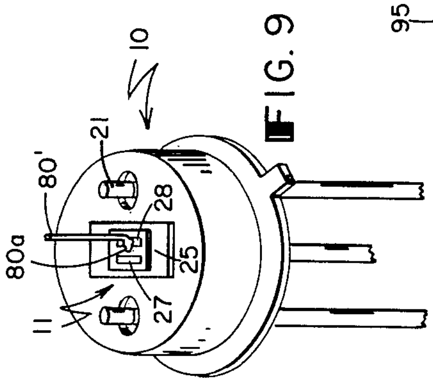
FIG. 9 is a perspective view of the transistor of FIG. 1 after a length of wire has been attached to a stripe by the apparatus according to the invention.

A length of wire 80′ is thus attached to a stripe on the transistor as shown in FIG. 9. The distance of the shear blades and bonding tool above the stripes is such as to provide a length of wire which will reach to the appropriate lead 21 on the transistor. The new end portion of the wire from the supply reel which extends through the passage in the bonding tool is in position adjacent the bonding surface and intermediate the bonding surface and the bonding location occupied by the transistor. The wire and tool are, therefore, in readiness for the next transistor which moves into the bonding location during the next index of the rotary turret. At subsequent stations of the rotary turret the wire is brought into contact with the lead and bonded to it as by thermal compression bonding. Another length of wire is attached to the other stripe 27 in the manner described above by a similar bonding apparatus and contact is similarly made to the other lead.

In employing apparatus according to the invention to attach a length of 0.4 mil diameter gold wire to a stripe of evaporated aluminum alloyed into a germanium wafer, a bonding tool 85 having a bonding surface 121 with a radius of curvature of about 0.5 mil is used. The weight 90 is positioned to provide a force of about 8 grams at the tip of the bonding tool. The temperature of the transistor is approximately 265° C. Compression of the wire against the stripe for a period of a fraction of a second under these conditions of heat and pressure provides a satisfactory electrical and mechanical bond.

Thermal compression bonding of a length of wire by employing the apparatus described completely eliminates handling of the wire during an operating cycle. The wire is maintained in the desired position with respect to the bonding tool and movement of the bonding tool carries both the bonding tool and wire into correct bonding position at the bonding location. The manner of operation of the severing mechanism positions the end of the wire from the supply in readiness for attaching a length of wire to the next transistor, and also assures that equal lengths of wire are applied to each transistor.

What is claimed is:

1. Apparatus for attaching a predetermined length of filamentary material to an object including in combination a moveable support; a holder moveably mounted on said moveable support and adapted to hold an object; mounting means for permitting movement of the holder with respect to the moveable support whereby an object in said holder can be oriented to a predetermined position with respect to the moveable support, and for fixing the position of said holder with respect to the moveable support; a fixed support; a bonding tool moveably mounted on said fixed support, said bonding tool having a bonding surface; positioning means for guiding filamentary material of a supply of filamentary material and maintaining it adjacent the bonding surface; means for moving said moveable support to position an object oriented to said predetermined position with respect to said moveable support at a bonding location adjacent said fixed support; moving means responsive to said means for moving the moveable support for advancing said bonding tool together with said filamentary material into bonding position with the bonding surface adjacent an object in position at the bonding location; thermal compression bonding means including the bonding tool for thermal compression bonding the filamentary material to an object in position at the bonding location; retracting means for withdrawing said bonding tool from said bonding position to a retracted position subsequent to thermal compression bonding of the filamentary material to an object in position at the bonding location; and cutting means responsive to withdrawal of the bonding tool to the retracted position for severing from the supply of filamentary material a length of filamentary material attached to the object, said cutting means including a portion adapted to cooperate with said bonding tool as the length of filamentary material is severed from the supply to place a portion of the filamentary material of the supply adjacent the bonding surface and intermediate the bonding surface and the bonding location.

2. Apparatus for attaching a predetermined length of filamentary material to an object including in combination a support, a plate mounted on said support and adapted to be moved vertically between a raised position and a lowered position, an arm pivotally mounted at one end thereof on said plate for movement about a horizontal axis, stop means mounted on said support for limiting the downward movement of the arm about the horizontal axis, a bonding tool affixed to the other end of said arm, said bonding tool having a bonding surface at the lower end thereof, a passage through said bonding tool having an aperture at said lower end adjacent the bonding surface for guiding filamentary material from a supply to adjacent the bonding surface, a supply of filamentary material mounted on said plate, a bonding location for supporting an object directly below the bonding tool at a distance from the bonding surface of the bonding tool when the plate is in the raised position less than the distance between the raised and lowered positions of the plate whereby when the plate is in the lowered position the end portion of the filamentary material from the supply intermediate the bonding surface and the bonding location is compressed between the bonding surface and the object, thermal compression bonding means including said bonding tool for thermal compression bonding the end portion of the filamentary material from the supply to the object at the bonding location while the end portion is compressed between the bonding surface and the object, cutting means for severing a section of filamentary material from the supply at a point adjacent the bonding surface and intermediate the bonding surface and the bonding location subsequent to thermal compression bonding of the end portion of the filamentary material from the supply to an object and movement of the plate to the raised position, said cutting means including a portion adapted to cooperate with said bonding tool as the section of filamentary material is severed from the supply to bend the end portion of the subsequent section of the filamentary material from the supply extending through the passage adjacent the bonding surface and intermediate the bonding surface and the bonding location, means for operating said cutting means, advancing and retracting means for moving said plate vertically between the raised and lowered positions, triggering means for actuating said advancing and retracting means upon positioning of an object at the bonding location, and a second triggering means responsive to movement of the plate to the raised position for actuating said means for operating the cutting means.

References Cited by the Examiner

UNITED STATES PATENTS

| | | | |
|---|---|---|---|
| 2,928,931 | 3/60 | Hoopes et al. | 219—85 |
| 3,059,321 | 10/62 | Pityo | 29—155.5 |
| 3,101,635 | 8/63 | Kulicke | 140—93 |

OTHER REFERENCES

"Electric Contact with Thermo-Compression Bond," H. Christensen, Bell Laboratories Record, April 1958.

CHARLES W. LANHAM, *Primary Examiner.*

WILLIAM F. PURDY, RICHARD A. WAHL, *Examiners.*